United States Patent
Koyama et al.

(10) Patent No.: US 12,325,775 B2
(45) Date of Patent: Jun. 10, 2025

(54) METHOD FOR PRODUCING POLYPHENOL DERIVATIVE, POLYPHENOL DERIVATIVE, AND POLYPHENOL DERIVATIVE-CONTAINING RESIN COMPOSITION MATERIAL

(71) Applicant: IDEMITSU KOSAN CO., LTD., Tokyo (JP)

(72) Inventors: Yoshihito Koyama, Chiba (JP); Hironori Tashiro, Chiba (JP)

(73) Assignee: IDEMITSU KOSAN CO., LTD., Tokyo (JP)

( * ) Notice: Subject to any disclaimer, the term of this patent is extended or adjusted under 35 U.S.C. 154(b) by 818 days.

(21) Appl. No.: 17/427,313

(22) PCT Filed: Feb. 7, 2020

(86) PCT No.: PCT/JP2020/004946
§ 371 (c)(1),
(2) Date: Jul. 30, 2021

(87) PCT Pub. No.: WO2020/162621
PCT Pub. Date: Aug. 13, 2020

(65) Prior Publication Data
US 2022/0119575 A1    Apr. 21, 2022

(30) Foreign Application Priority Data
Feb. 8, 2019  (JP) ................. 2019-021762

(51) Int. Cl.
*C08G 8/20*  (2006.01)
*C08L 97/00*  (2006.01)

(52) U.S. Cl.
CPC .............. *C08G 8/20* (2013.01); *C08L 97/005* (2013.01)

(58) Field of Classification Search
CPC ......... C08G 8/20; C08G 65/38; C08L 97/005; C07G 1/00; C08H 6/00
See application file for complete search history.

(56) References Cited

U.S. PATENT DOCUMENTS

2013/0115653 A1    5/2013    Peterson et al.

FOREIGN PATENT DOCUMENTS

| JP | S61-261358 A | | 11/1986 |
|---|---|---|---|
| JP | 2010184233 | * | 8/2010 |
| JP | 2010184233 A | * | 8/2010 |
| JP | 2014-037354 A | | 2/2014 |
| JP | 5671430 B2 | | 2/2015 |
| JP | 2015-048359 A | | 3/2015 |
| JP | 2015-519452 A | | 7/2015 |
| JP | 2016-050200 A | | 4/2016 |
| JP | 2016-540058 A | | 12/2016 |
| WO | WO-2013/068092 A | | 5/2013 |
| WO | WO-2015/147165 A1 | | 10/2015 |
| WO | WO-2019/031609 A | | 2/2019 |

OTHER PUBLICATIONS

Novaes (E. Novaes et al, Lignin and Biomass: A Negative Correlation for Wood Formation and Lignin Content in Trees1, Plant Physiol. vol. 154, 2010, p. 555-561).*
Lee (S. J. Lee et al, Isolation and characterization of lignin from the oak wood bioethanol production residue for adhesives, International Journal of Biological Macromolecules 72 (2015) 1056-1062).*
Guo (Guo et al, Separation and characterization of lignin from bio-ethanol production residue, Bioresource Technology, 135, 2013, 738-741).*
Extended European Search Report issued in connection with EP Appl. Ser. No. 20752574.2 dated Nov. 17, 2022.
International Search Report on International Patent Application No. PCT/JP2020/004946 dated Mar. 31, 2020 (7 pages).
Office Action, dated Jul. 18, 2023, issued in corresponding Japanese Patent Application No. 2020- 571310 (10 pages).
Office Action, dated Dec. 12, 2023, issued in corresponding Japanese Patent Application No. 2020-571310.
Office Action issued in corresponding Brazilian Patent Application No. BR112021014870-1 dated Aug. 21, 2023 (7 pages).
Office Action issued in corresponding Chinese Patent Application No. 202080012883.1 dated Sep. 4, 2024 (13 pages).
Office Action issued in corresponding Chinese Patent Application No. 202080012883.1 dated Nov. 21, 2024.
Office Action issued in corresponding Brazilian Patent Application No. 112021014870-1 dated Feb. 16, 2025.

* cited by examiner

*Primary Examiner* — Kumar R Bhushan
(74) *Attorney, Agent, or Firm* — Foley & Lardner LLP

(57) ABSTRACT

A method for producing a polyphenol derivative, including reacting a polyphenol-containing composition and an aromatic compound having an ortho-para directionality in a solvent, a polyphenol derivative produced by the method for producing a polyphenol derivative, and a polyphenol derivative-containing resin composition material containing the polyphenol derivative.

13 Claims, No Drawings

METHOD FOR PRODUCING POLYPHENOL DERIVATIVE, POLYPHENOL DERIVATIVE, AND POLYPHENOL DERIVATIVE-CONTAINING RESIN COMPOSITION MATERIAL

CROSS-REFERENCE TO RELATED APPLICATIONS

The present application claims priority under 37 U.S.C. § 371 to International Patent Application No. PCT/JP2020/004946, filed Feb. 7, 2020, which claims priority to and the benefit of Japanese Patent Application No. 2019-021762, filed on Feb. 8, 2019. The contents of these applications are hereby incorporated by reference in their entireties.

TECHNICAL FIELD

The present invention relates to a method for producing a polyphenol derivative, a polyphenol derivative, and a polyphenol derivative-containing resin composition material.

BACKGROUND ART

Applications of carbon-neutral plant-derived materials to plastic materials have been expected from the standpoint of the greenhouse gas mitigation. The plant-derived materials mainly include cellulose and hemicellulose derived from sugars, and a polyphenol, such as lignin. Among these, a polyphenol, such as lignin, is expected to have useful applications as a plastic material due to the aromatic rings, aliphatic hydroxy groups, and aromatic hydroxy groups contained therein. However, a polyphenol, such as lignin, has two issues, i.e., (a) a convenient and economically efficient isolation and purification method of a polyphenol, such as lignin, has not yet been established, and (b) a polyphenol, such as lignin, is difficult to biodegrade, is substantially not dissolved in a solvent, is poor in handleability due to the high softening point thereof, and is poor in reactivity with the existing plastic materials, and therefore substantially no application of a polyphenol, such as lignin, as a plastic material has been found out due to the issues (a) and (b). Accordingly, for making a polyphenol, such as lignin, favorable as a plastic material, techniques for performing suitable isolation and purification thereof, modification thereof, and applications of the modified polyphenol, such as modified lignin, have been studied.

Old examples of the isolation of a polyphenol, such as lignin, from a biomass residue include the isolation of a polyphenol, such as lignin, from black liquor, which is a residue in pulp industries. However, a black liquor contains a large amount of contaminants, such as inorganic salts, and thus has been applied to a material having low industrial value, such as a fuel. In recent years, as described in PTL 1, such an approach has been known that lignin contained in a black liquor is isolated through modification, such as reaction with PEG (polyethylene glycol), so as to enhance the industrial value.

Furthermore, as for the application of isolated lignin or the like, for example, PTL 2 describes techniques relating to a modified lignin imparted with reactivity through introduction of a benzoxazine skeleton to lignin without decreasing the molecular weight of lignin, and a molding material enhancing the mechanical strength and the like of a molded article with the modified lignin contained therein.

PTL 3 describes a technique of enhancing the reactivity of lignin in such a manner that lignin is phenolated through reaction with a phenol compound in the presence of a catalyst, and then heated with an alkali to form an alkalified lignin, to which an aldehyde compound is further added to form a hydroxymethylated lignin, and a technique of applying the lignin having enhanced in reactivity to a binder composition.

PTL 4 describes a phenol-modified lignin resin and the like improved in resin strength through enhancement of the curability by a production method of reacting lignin with a phenol compound and an aldehyde compound in the presence of an acid.

CITATION LIST

Patent Literatures

PTL 1: JP 2015-519452
PTL 2: Japanese Patent No. 5,671,430
PTL 3: JP 2016-540058
PTL 4: WO 2015/147165

SUMMARY OF INVENTION

Technical Problem

In the case where the greenhouse gas mitigation is aimed by applying a polyphenol, such as lignin, to plastic materials as described above, there is an issue that the following four requirements are necessarily satisfied, i.e., the polyphenol (i) can be available at low cost, (ii) can be provided in a large quantity, (iii) can be readily mixed with a resin, and (iv) can be readily reacted with a resin. However, sulfide lignin, kraft lignin, and soda lignin obtained from a black liquor or the like emitted from the pulp industries, which are currently assumed to be a lignin raw material, can satisfy the requirements (i) and (ii), but sulfide lignin is difficult to satisfy the requirement (iv) due to the high sulfur content thereof and may be inferior in the requirement (iii) due to the water solubility thereof. Kraft lignin and soda lignin also cannot satisfy the requirements (iii) and (iv) due to the high molecular weight thereof. In recent years, organo-soluble lignin soluble in an organic solvent has been reported (one example of which is the PEG lignin described in PTL 1) and is said to address the issue, but there is a problem in solution of the requirements (i) and (ii).

Under the circumstances, an object of the present invention is to provide a method for producing a polyphenol derivative at low cost that has an enhanced reactivity with an existing plastic material, has good compatibility with a resin, and is capable of providing a molded article having enhanced properties, such as an enhanced flexural strength, and a lignin derivative and a lignin derivative-containing resin composition material that are capable of providing the molded article.

Solution to Problem

As a result of the earnest investigations for solving the issues, the present inventors have found that the issues can be solved in such a manner that an aromatic compound having an ortho-para directing group is acted on a polyphenol-containing composition, such as a biomass, in a solvent, so as to isolate a polyphenol as a polyphenol derivative, and simultaneously to achieve the reduction of the light component derived from the polyphenol and the decrease of the molecular weight in one reaction.

Specifically, the present invention relates to the following.

[1] A method for producing a polyphenol derivative, including reacting a polyphenol-containing composition and an aromatic compound having an ortho-para directionality in a solvent.

[2] A lignin derivative having a weight average molecular weight of less than 5,000 and an existence ratio of a component having a molecular weight Log M of 2.15 to 2.20 of less than 0.7% by mass.

[3] A lignin derivative-containing resin composition material containing a lignin derivative that is produced by the method for producing a polyphenol derivative or the lignin derivative.

Advantageous Effects of Invention

According to the present invention, a method for producing a polyphenol derivative at low cost that has an enhanced reactivity with an existing plastic material, has good compatibility with a resin, and is capable of providing a molded article having enhanced properties, such as an enhanced flexural strength, and a lignin derivative and a lignin derivative-containing resin composition material that are capable of providing the molded article can be provided.

DESCRIPTION OF EMBODIMENTS

[Method for Producing Polyphenol Derivative]

The method for producing a polyphenol derivative of the present invention includes reacting a polyphenol-containing composition and an aromatic compound having an ortho-para directing group in a solvent.

The "polyphenol derivative" in the present invention means a reactant derived from a polyphenol that is obtained through reaction of a polyphenol contained in a polyphenol-containing composition with an aromatic compound.

Examples of the polyphenol contained in the polyphenol-containing composition include lignite, lignin, tannin, catechin, anthocyanin, rutin, isoflavone, lignan, curcumin, and chlorogenic acid.

In the method for producing a polyphenol derivative of the present invention, in particular, the polyphenol contained in the polyphenol-containing composition is preferably lignin from the standpoint of the usefulness as a plastic material. Accordingly, the polyphenol derivative herein is preferably a lignin derivative.

In the description herein, the case where the polyphenol contained in the polyphenol-containing composition is lignin, and the polyphenol derivative is a lignin derivative will be specifically described as an example, but the method for producing a polyphenol derivative of the present invention is not limited to the lignin and the lignin derivative.

Lignin is a polymer compound formed through polymerization of three kinds of lignin monomers, which are p-hydroxy cinnamic alcohol compounds, and has a basic skeleton represented by the following formula (2).

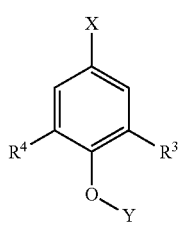

(2)

In the formula (2), $R^3$ and $R^4$ as substituents each represent a hydrogen atom or a methoxy group. The skeleton having $R^3$ and $R^4$ that are both hydrogen atoms is referred to as a p-hydroxyphenyl nucleus (H-type skeleton), the skeleton having any one of $R^3$ and $R^4$ that is a hydrogen atom is referred to as a guaiacyl nucleus (G-type skeleton), and the skeleton having $R^3$ and $R^4$ that are both not a hydrogen atom is referred to as a syringyl nucleus (S-type skeleton).

In the formula (2), X represents a bond to a carbon atom, and Y represents a bond to a hydrogen or carbon atom.

In the basic skeleton of lignin, the carbon atoms bonded to $R^3$ and $R^4$ each are a reactive site having high reactivity (which may be hereinafter referred simply to as a "reactive site"), but the reactivity of the carbon atom becomes poor in the case where $R^3$ or $R^4$ is a methoxy group. Accordingly, for reacting lignin, $R^3$ and $R^4$ preferably represent hydrogen atoms.

Lignin also contains an aliphatic moiety in addition to the aforementioned aromatic moiety, and a hydroxy group existing in the aliphatic moiety is poor in oxidation stability (the aliphatic hydroxy group is changed to an aldehyde or a carboxylic acid through oxidation). Therefore, the amount of the hydroxy group existing in the aliphatic moiety is preferably as small as possible for improving the reactivity with an existing plastic material.

Furthermore, by decreasing the softening point of the lignin derivative without largely decreasing the molecular weight, the mixing capability can be enhanced, and the reactivity with an existing plastic material can be enhanced.

Consequently, lignin derivative that has a large amount of the two kinds of skeletons having high reactivity, i.e., the H-type skeleton and the G-type skeleton, has a small amount of an aliphatic hydroxy group, and more preferably has a softening point decreased without largely decreasing the molecular weight has high reactivity and is favorable as a plastic material.

In the production method of the present invention, the polyphenol-containing composition and the aromatic compound are mixed in a solvent, and thereby the lignin derivative suitable as a plastic material is provided by utilizing the substitution reaction converting the substituents $R^3$ and $R^4$ in the lignin basic skeleton represented by the formula (2) in the polyphenol-containing composition to the aromatic compound.

<Reaction Step>
<Polyphenol-Containing Composition>

In the method for producing a polyphenol derivative of the present invention, the polyphenol-containing composition used as a raw material may be one or more kind of a biomass and a biomass residue.

Examples of the biomass residue include a biomass residue derived from a plant biomass, such as a woody biomass and a herbaceous biomass.

Examples of the biomass residue also include a saccharification residue and a fermentation residue of a lignocellulose based biomass (i.e., a second generation ethanol saccharification residue and a second generation ethanol fermentation residue), a black liquor (such as sulfide lignin, kraft lignin, and soda lignin), and tannin, and one or more kind thereof may be used. Among these, the polyphenol-containing composition used may be one or more kind of a second generation ethanol saccharification residue and a second generation ethanol fermentation residue from the standpoint of the availability, the quality of the polyphenol derivative, and the economical efficiency.

(Lignocellulose Based Biomass)

Examples of the inedible plant biomass include a woody biomass and a herbaceous biomass. Examples of the woody biomass include coniferous trees and broad-leaf trees, such as cedar trees, Japanese cypress trees, false cypress trees, cherry trees, eucalyptus trees, beech trees, and bamboos.

Examples of the herbaceous biomass include trunks and empty fruit bunches of palm, fibers and seeds of palm fruits, bagasse (pomace remaining after extracting sugarcane and high-biomass sugarcane), cane tops (tops and leaves of sugarcane), energy cane, rice straws, wheat straws, cobs, stovers, and residues of corn (corn stovers, corn cobs, and corn hulls), Sorghum (including sweet sorghum) residues, seed coats and hulls of Jatropha curcas, cashew hulls, switchgrass, Erianthus, high-biomass-yield crops, and energy crops.

Among these, a herbaceous biomass is preferred, empty fruit bunches of palm, wheat straws, cobs, stovers, and residues of corn (corn stovers, corn cobs, and corn hulls), bagasse, cane tops, energy cane, and residues after the extraction of the useful components thereof are more preferred, and cobs, stovers, and residues of corn (corn stovers, corn cobs, and corn hulls), bagasse, cane tops, and energy cane are further preferred, from the standpoint of the availability and the adequateness to the production method applied in the present invention. The useful components include hemicellulose, a carbohydrate, a mineral, and water.

Bagasse contains lignin in an amount of approximately from 5 to 30% by mass. The lignin in bagasse contains all the H-type nucleus, the G-type nucleus, and the S-type nucleus as a basic skeleton.

The plant biomass may be used after crushing. The plant biomass may be in any form of blocks, chips, powder, and a hydrous material containing water.

Bagasse, corn stovers, and the like are subjected to such a treatment as an organosolv method, a pressurized hot water method, a steam blasting method, an ammonia treatment method, an ammonia blasting method, an acid treatment method, an alkali treatment method, an oxidation decomposition method, a thermal decomposition method, or a microwave heating method, preferably to such a treatment as an acid treatment method, an ammonia blasting method, or a steam blasting method, so as to isolate hemicellulose to the solution, and then cellulose is converted to glucose with an enzyme to isolate glucose to the solution, or in alternative, hemicellulose is not isolated but is saccharified along with cellulose to isolate to the solution, thereby resulting in the second generation ethanol saccharification residue as the remaining solid. In alternative, the saccharides are not isolated but are converted to ethanol through fermentation, and ethanol is isolated to the solution, thereby resulting in the second generation ethanol fermentation residue as the remaining solid.

The second generation ethanol saccharification residue contains lignin as a major component, and also contains decomposition organic substances, catalysts, enzymes, ash components, cellulose, and the like. The second generation ethanol fermentation residue contains lignin as a major component, and also contains decomposition organic substances, catalysts, enzymes, yeasts, ash components, cellulose, and the like.

While more specific embodiments of the production method of the present invention will be described in the examples shown later, the production method may be as follows. With one or more kind of the second generation ethanol saccharification residue and the second generation ethanol fermentation residue used as a raw material, a solvent and the aromatic compound are added thereto. After continuous heating for approximately from 2 to 4 hours, the heated mixture contains insoluble matters, which are filtered out with No. 2 filter paper in a hot state. The filtered solid includes unreacted matters and inorganic contaminants. The filtrate is distilled under reduced pressure to remove the solvent and the unreacted aromatic compound. The aromatic compound that cannot be completely removed through the distillation may be removed through vacuum drying, or depending on necessity by repeating dissolution in acetone and reprecipitation from water as a poor solvent therefor. The solid matter thus isolated is the lignin derivative having been modified. In the case where the aromatic compound remaining after the distillation may not cause problem in the subsequent reaction, the product may be used directly as a plastic material.

The polyphenol-containing composition used as the raw material may be lignin isolated from an inedible plant biomass through such a treatment as an organosolv method, a pressurized hot water method, a steam blasting method, an ammonia treatment method, an ammonia blasting method, an acid treatment method, an alkali treatment method, an oxidation decomposition method, a thermal decomposition method, or a microwave heating method. Specifically, for example, such lignin may be used that is isolated in such a manner that with the use of an organic solvent or a solvent containing an organic solvent and water, lignin contained in an inedible plant biomass is eluted to the solvent by treating at a high temperature, and the lignin-containing solution is filtered to remove cellulose and the like, followed by concentrating and drying the solution.

<Aromatic Compound>

It suffices that the aromatic compound having an ortho-para directing group (which may be hereinafter referred simply to as an "aromatic compound") is an aromatic compound that has one or more ortho-para directing group.

Examples of the ortho-para directing group include an electron donating substituent, for example, such a functional group as a hydroxy group, a methoxy group, an aliphatic hydrocarbon group, an amino group, and a halogen group, and a hydroxy group is preferred. Accordingly, the aromatic compound is preferably a phenol compound.

The aromatic compound may be a compound having a hydrogen atom at at least one of the 2-position, the 4-position, and the 6-position, which are the positions of substituents with respect to the ortho-para directing group, and preferred examples thereof include a compound represented by the following formula (A).

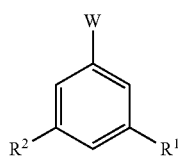

(A)

In the formula (A), W represents the ortho-para directing group, and $R^1$ and $R^2$ each independently represent a hydrogen atom, a hydroxy group, or an alkyl group having 1 to 15 carbon atoms, in which $R^1$ and $R^2$ may be the same as or different from each other.

The alkyl group having 1 to 15 carbon atoms may be linear or branched. The alkyl group having 1 to 15 carbon atoms is preferably a linear or branched alkyl group having 1 to 15 carbon atoms, more preferably a linear or branched alkyl group having 1 to 5 carbon atoms, and further preferably a linear alkyl group having 1 to 3 carbon atoms.

Examples of the aromatic compound represented by the formula (A) include phenol, anisole, toluene, ethylbenzene, n-propylbenzene, isopropylbenzene, n-butylbenzene, isobutylbenzene, t-butylbenzene, aniline, methylaniline, N,N-dimethylaniline, chlorobenzene, m-cresol, p-cresol, o-cresol, m-methoxyphenol, m-xylene, 1,3-diethylbenzene, 3-methylaniline, 3-methyl-N-methylaniline, 3-methyl-N,N-dimethylaniline, m-dichlorobenzene, m-chlorotoluene, 3,5-dimethylphenol, 3,5-dimethylanisol, mesitylene, 3,5-dimethylaniline, 3,5-dimethyl-N-methylaniline, 3,5-dimethyl-N,N-dimethylaniline, 3-chloro-m-xylene, and 3,5-dichlorotoluene.

[Phenol Compound]

The aromatic compound is preferably a phenol compound having a hydroxy group as the ortho-para directing group, as described above.

The phenol compound is preferably a phenol compound having a hydrogen atom at at least one of the 2-position, the 4-position, and the 6-position, which are the positions of substituents with respect to the hydroxy group.

A phenol compound having hydrogen atoms at the 2-position, the 4-position, and the 6-position (i.e., the ortho-positions and the para-position) is particularly preferred as a receptor of the substituent in the substitution reaction with lignin due to the directionality thereof. The mechanism therefor is that in mixing the polyphenol-containing composition and the phenol compound in a solvent, the substituent represented by $R^3$ and $R^4$ in the basic skeleton of lignin represented by the formula (2) in the polyphenol-containing composition are transferred to the 2-position, the 4-position, or the 6-position of the phenol compound. Both $R^3$ and $R^4$ of lignin become hydrogen atoms through the substitution reaction, resulting in the lignin derivative having an increased number of the reactive site.

Accordingly, the substitution reaction decreases the S-type skeleton in lignin and increases the G-type skeleton and the H-type skeleton, and thus improves the reactivity. Furthermore, as described above, the substitution reaction lowers the molecular weight through modification of the molecular chain of lignin, and simultaneously improves the mixing capability of the lignin derivative.

The phenol compound may be used alone or as a combination of two or more kinds thereof.

The phenol compound is preferably a compound represented by the following formula (1), in which W in the formula (A) represents a hydroxy group. This phenol compound can favorably perform the substitution reaction due to the receptors at at least three positions.

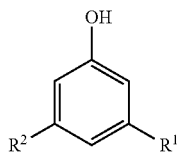

(1)

In the formula (1), $R^1$ and $R^2$ have the same meaning as $R^1$ and $R^2$ in the formula (A).

Examples of the phenol compound represented by the formula (1) include phenol, resorcinol, phloroglucin, a 3-alkylphenol, such as m-cresol, 3-ethylphenol, and 3-propylphenol; a 5-alkylresorcinol, such as 5-methylresorcinol, 5-ethylresorcinol, and 5-propylresorcinol; and a 3,5-dialkylphenol, such as 3,5-dimethylphenol, 3-methyl-5-ethylphenol, and 3,5-thethylphenol.

The phenol compound having a hydroxy group at at least one of $R^1$ and $R^2$ may be used from the standpoint that the phenol compound that has plural hydroxy groups has an increased acidity, from which the progress of the reaction without catalyst can be expected. Examples of the phenol compound of this type include resorcinol, phloroglucin, and a 5-alkylresorcinol (such as 5-methylresorcinol and 5-ethylresorcinol).

<Solvent>

The reaction of the polyphenol-containing composition and the aromatic compound is performed in a solvent.

The polyphenol in the polyphenol-containing composition is reacted with the aromatic compound, and in the case where no solvent is used in the reaction, the reaction proceeds, but the amount of the aromatic compound used is increased as compared to the case using the solvent. Furthermore, the use of the solvent is preferred from the standpoint of the economic efficiency since the solubility of the polyphenol is increased with the solvent, enabling the reaction proceeding favorably, and a yield exceeding a certain level can be achieved without significant decrease in yield even though the amount of the aromatic compound used is relatively small.

The solvent preferably contains a polar solvent from the standpoint of the enhancement of the solubility of the polyphenol, such as lignin, in the raw material. The solvent preferably contains one or more kind of an organic solvent, for example, an alcohol compound, a ketone compound, an ether compound, an aromatic compound, and water from the standpoint of the solubility of the polyphenol, such as lignin, in the raw material, and the economic efficiency. The solvent may be specifically one or more kind of an organic solvent such as an alcohol compound, such as methanol, ethanol, and isopropyl alcohol, a ketone compound, such as acetone and methyl ethyl ketone, an ether compound, such as tetrahydrofuran, and an aromatic compound, and water.

The organic solvent preferably has 1 to 6 carbon atoms, more preferably 1 to 4 carbon atoms, and further preferably 1 to 3 carbon atoms, from the standpoint of the ease in regulating the softening point to a suitable range without becoming too high, the solubility of the polyphenol, such as lignin, and the economic efficiency.

Among the solvents described above, one or more kind of ethanol, acetone, and water is preferably used, one or more kind of ethanol and water is more preferably used, and ethanol or a combination of ethanol and water is further preferably used, from the standpoint of the decrease of the softening point of the polyphenol derivative, such as the lignin derivative, the achievement of a high yield, and the economic efficiency. In particular, a high yield can be expected from the combination use of water and an organic solvent in combination.

In the case where an organic solvent and water are used in combination, the mass ratio thereof (organic solvent/water) is preferably 95/5 to 5/95, more preferably 95/5 to 20/80, further preferably 95/5 to 30/70, still further preferably 95/5 to 40/60, still more further preferably 95/5 to 50/50, and still more further preferably 90/10 to 50/50, from the standpoint of the decrease of the softening point of the polyphenol derivative, such as the lignin derivative, the achievement of a high yield, and the economic efficiency.

The aromatic compound may be used in an amount of 4 to 95% by mass based on the total amount of the aromatic compound and the solvent. In the case where the amount of the aromatic compound used exceeds 95% by mass, there is a tendency that the molecular weight is decreased, and the strength is decreased, resulting in deterioration of the economic efficiency. In the case where the amount of the aromatic compound used is 4% by mass or more, the softening point of the polyphenol derivative, such as the lignin derivative, does not become too high, and the compatibility thereof with a resin is improved, avoiding the concern about decrease in yield. In the case where the amount of the aromatic compound used is 4% by mass or more, furthermore, the reaction of the polyphenol-containing composition and the aromatic compound having an ortho-para directing group in the solvent is expected to perform effectively. The amount of the aromatic compound used is preferably 10 to 70% by mass, more preferably 10 to 50% by mass, and further preferably 20 to 40% by mass, from the standpoint of the economic efficiency.

<Mass Ratio (Aromatic Compound/Lignin)>

In the production method of the present invention, it generally suffices that the mass ratio of the aromatic compound to the polyphenol, such as lignin, in the polyphenol-containing composition (aromatic compound/polyphenol, such as lignin) is approximately 0.1 to 15. The mass ratio is preferably 0.1 to 10, more preferably 0.1 to 5, further preferably 0.1 to 4, still further preferably 0.1 to 3, still more preferably 0.1 to 2, still more further preferably 0.1 to 1, still more further preferably 0.1 to 0.7, and still more further preferably 0.1 to 0.5, from the standpoint of the economic efficiency and the favorable progress of the substitution reaction.

<Acid Catalyst>

In the production method of the present invention, the reaction of the polyphenol-containing composition and the aromatic compound is preferably performed without catalyst or in the presence of an acid catalyst in an amount of more than 0 to 5.0% by mass, and further 0.1 to 3.0% by mass, based on the total amount of the polyphenol, such as lignin, in the polyphenol-containing composition and the aromatic compound.

The reaction can be performed without catalyst depending on the aromatic compound used for the reaction as described above. By the reaction performed without catalyst, for example, the subsequent treatment after the reaction step (purification step) can be omitted, and the enhancement of the properties, such as the flexural strength, of a molded article using the resulting polyphenol derivative as a plastic material can be expected.

Examples of the acid catalyst include an inorganic acid, such as phosphoric acid, a phosphate ester, hydrochloric acid, sulfuric acid, and a sulfate ester, and an organic acid, such as acetic acid, formic acid, oxalic acid, and p-toluenesulfonic acid. The acid catalyst may be used alone or as a combination of two or more kinds thereof.

In the case where the acid catalyst is used in the reaction, the amount of the acid catalyst used with respect to the total amount of the polyphenol, such as lignin, in the polyphenol-containing composition and the aromatic compound generally has no particular upper limit, as far as the amount is more than 0, and the reaction is generally performed in the presence of the acid catalyst in an amount of 0.01 to 5.0% by mass, preferably 0.1 to 3.0% by mass, more preferably 0.2 to 3.0% by mass, and further preferably 0.2 to 2.6% by mass, from the standpoint of the favorable exhibition of the effect of the acid catalyst added, and the impurities remaining in the polyphenol derivative. With the use of the acid catalyst in an amount within the range, the aforementioned reaction can be performed favorably. In the case where the amount of the acid catalyst used exceeds the range, the hydrolysis of cellulose, hemicellulose, and the like contained in the biomass or the biomass residue as the polyphenol-containing compound may proceed, and simultaneously the concentration of the sulfate radical may be increased, resulting in increase of the purification cost due to the increase of impurities.

<Reaction Temperature and Time>

The reaction temperature is generally not particularly limited, as far as the reaction temperature is 100° C. or more, and is generally approximately more than 140° C. and 350° C. or less, preferably more than 140° C. and 300° C. or less, more preferably more than 140° C. and 270° C. or less, further preferably more than 140° C. and 250° C. or less, still further preferably 150 to 230° C., and still more further preferably 180 to 230° C. At a temperature exceeding 140° C., the lignin derivative can be dissolved to perform the reaction, and at a temperature of 300° C. or less, the reverse reaction can be prevented from proceeding.

The reaction time is generally approximately 0.1 to 15 hours, and is preferably 0.5 hour or more, and more preferably 1 hour or more, from the standpoint that the reaction can sufficiently proceed to modify the polyphenol, and is preferably 10 hours or less, more preferably 1 hour or more and 8 hours or less, and further preferably 2 hours or more and 8 hours or less, from the standpoint that the progress of the reaction cannot be expected from a too long reaction time.

<Reaction Pressure>

The reaction pressure is generally not particularly limited, as far as the reaction pressure is 0.05 MPa or more, and is generally preferably approximately 0.1 MPa or more and 30 MPa or less. However, the preferred range of the reaction in the reaction system is influenced by the amount of the solvent and the temperature, and thus may be appropriately determined. The reaction may also be performed in the peripheral atmosphere. The reaction is particularly preferably performed in an atmosphere with decreased oxygen content through nitrogen purge, for suppressing polymerization due to oxidation reaction.

The reaction method for the reaction is not particularly limited, and examples thereof include still standing and agitation. For example, an ordinary batch reactor, an ordinary semibatch reactor, and the like may be used. A method of treating while extruding a slurry containing the biomass or the biomass residue and the solvent with a screw, a pump, or the like may also be applied.

<Purification Step>

The polyphenol derivative of the present invention is produced by performing the aforementioned reaction step. Accordingly, the lignin derivative produced by the method for producing a polyphenol derivative through the reaction step can be used directly as a plastic material, and a purification step may be performed after the reaction step. For example, the method for producing a polyphenol derivative preferably includes a solid-liquid separation step, in addition to the reaction step.

<Solid-Liquid Separation>

After the reaction described above, the polyphenol derivative is in a dissolved state in the solvent and the aromatic compound, and the unreacted matters and the inorganic residues are present as solid matters in the liquid. These matters are preferably removed by filtration (in a hot state). For example, the reaction liquid is placed in a pressure filtration device (in a hot state) having set thereto No. 5C filter paper, No. 2 filter paper, or the like, and filtered under pressure at a temperature of approximately 20 to 100° C., approximately 20 to 70° C., and generally approximately 20 to 50° C., and a pressure of approximately 0.1 to 0.99 MPa, and generally approximately 0.1 to 0.4 MPa. The filtered solid matters may be diluted and/or washed with the solvent, and then filtered. In the filtration, the polyphenol derivative is contained in the filtrate. The reaction solution may be diluted and/or washed with one or more kind of water and a general-purpose low boiling point solvent, for example, a ketone compound, such as acetone and methyl ethyl ketone, an alcohol compound, such as methanol, ethanol, and isopropyl alcohol, and an ether compound, such as tetrahydrofuran, and then subjected to solid-liquid separation. In the solid-liquid separation, the polyphenol derivative is contained in the solution.

The method of performing the solid-liquid separation is not particularly limited, and examples thereof include filtration, filter press, centrifugal separation, and dehydration.

<Distillation>

The distillation may be performed, for example, by subjecting the solution containing the polyphenol derivative to distillation under pressure at a temperature of approximately 40 to 200° C., and generally approximately 50 to 150° C., under a reduced pressure of approximately 3 to 20 kPa, and generally approximately 5 to 10 kPa, so as to remove the solvent and the aromatic compound. In the distillation, the polyphenol derivative is obtained as a solid matter. For example, in the case where another diluting solvent is used, distillation may be performed under reduced pressure at an appropriate temperature in consideration of the boiling point of the solvent, so as to remove the general-purpose low boiling point solvent, and thereafter the aromatic compound may be removed in the same manner as above. In the distillation, the polyphenol derivative is obtained as a solid matter.

<Drying Under Reduced Pressure>

The polyphenol derivative obtained through the distillation may be purified by heating generally to 50 to 200° C. and vacuum-drying in a solid state or a molten state, so as to remove the aromatic compound after the reaction. The polyphenol derivative in a fluidized state under heating after the distillation may be purified by directly subjecting to the similar vacuum drying, so as to remove the aromatic compound after the reaction.

<Reprecipitation>

In the case where the polyphenol derivative obtained through the distillation or the drying under reduced pressure contains the aromatic compound remaining, the polyphenol derivative obtained through the distillation may be purified by dissolving in a solvent, such as acetone, and reprecipitating by adding ion exchanged water or the like as the poor solvent for the polyphenol derivative, so as to remove the aromatic compound after the reaction.

In the purification step, the filtration, the distillation, the drying under reduced pressure, and the reprecipitation each may be performed repeatedly, and one or two or more thereof may be combined.

The amount of the aromatic compound remaining in the polyphenol derivative is not particularly limited, and is generally less than 30%, preferably less than 10%, more preferably less than 5%, and further preferably less than 1%.

[Polyphenol Derivative]

The production method of the polyphenol derivative of the present invention is not particularly limited, as far as the effects of the present invention are not impaired, and the polyphenol derivative is preferably produced by the method for producing a polyphenol derivative described above.

As described above, lignin may include an H-type skeleton, a G-type skeleton, and an S-type skeleton existing therein. The polyphenol derivative of the present invention may have a ratio ((2H+G)/S) of the total of twice of the relative existence ratio H (%) of the H-type skeleton and the relative existence ratio G (%) of the G-type skeleton with respect to the relative existence ratio S (%) of the S-type skeleton, obtained from integrated values measured by $^{31}$P-NMR, of 2.3 or more, and may have an existence ratio of an aliphatic hydroxy group with respect to the total of existence ratios of the aliphatic hydroxy group and an aromatic hydroxy group, obtained from integrated values measured by $^{31}$P-NMR, of less than 27%. In the case where the ratio ((2H+G)/S) is 2.3 or more, there is a tendency that the reactivity with an existing plastic material is improved. Similarly, in the case where the existence ratio of the aliphatic hydroxy group is less than 27%, there is a tendency that the reactivity with an existing plastic material is improved.

The ratio ((2H+G)/S) is preferably 2.4 or more, more preferably 2.5 or more, and further preferably 2.6 or more, from the standpoint of the further enhancement of the reactivity of the polyphenol derivative, and the achievement of a molded article having enhanced properties, such as an enhanced flexural strength. The upper limit of the ratio ((2H+G)/S) is not particularly limited, as far as the effects of the present invention are not impaired, and is preferably 10.0 or less, more preferably 7.0 or less, and further preferably 5.0 or less, from the standpoint of the productivity. The existence ratio of the aliphatic hydroxy group is preferably less than 25%, more preferably less than 23%, and further preferably less than 20%, and is preferably as close as to 0%, from the same standpoint.

The relative existence ratios of the S-type skeleton, the H-type skeleton, and the G-type skeleton, and the amount of the aliphatic hydroxy group are values that are obtained from integrated values measured by $^{31}$P-NMR, and the details of the $^{31}$P-NMR measurement are described in Magnetic Resonance in Chemistry, vol. 33, pp 375-382 (1995). In the present invention, more specifically, these values can be measured by the methods described in the examples shown later.

<Molecular Weight and Softening Point>

The molecular weight of the polyphenol derivative of the present invention is decreased by the modification of the molecular chain of $R^3$ and $R^4$ through the substitution reaction described above. Accordingly, lignin can be extracted as the polyphenol derivative in a high efficiency through the decrease of the molecular weight, is simultaneously enhanced in the mixing capability (i.e., the kneading capability and the agitation capability) with the another resin material, and is expected to provide a molded article having further enhanced properties, such as an enhanced flexural strength.

The polyphenol derivative of the present invention has the aromatic compound inserted to the substitution site, and therefore the softening point is not decreased largely even though the molecular weight is decreased.

Accordingly, the softening point of the polyphenol derivative of the present invention can be preferably 90° C. or more, more preferably 130° C. or more, and further preferably 150° C. or more. In the case where the softening point is 90° C. or more, a resin composition material containing the polyphenol derivative can be prevented from suffering problems including blister after the molding and post curing. The softening point of the polyphenol derivative is preferably 210° C. or less, more preferably 200° C. or less, further preferably 190° C. or less, still further preferably 180° C. or less, and still more further preferably 160° C. or less. In the case where the softening point is 210° C. or less, a resin composition material containing the polyphenol derivative can be more readily handled.

The polyphenol derivative of the present invention may have a weight average molecular weight of less than 5,000 and an existence ratio of a component having a molecular weight Log M of 2.15 to 2.20 of less than 0.7% by mass.

In the case where the weight average molecular weight of the polyphenol derivative is 5,000 or more, the properties, such as the flexural strength, of the molded article may be difficult to enhance.

The weight average molecular weight of the polyphenol derivative is preferably 3,000 or more and 4,000 or less, the weight average molecular weight thereof is preferably 2,000 or more and less than 3,000, the weight average molecular weight thereof is preferably 1,000 or more and less than 2,000, and the weight average molecular weight thereof is preferably 600 or more and less than 1,000.

In the case where the existence ratio of a component having a molecular weight Log M of 2.15 to 2.20 of the polyphenol derivative is 0.7% by mass or more, there is a concern of occurrence of problems including blister after the molding and post curing of the resin composition material containing the polyphenol derivative. The existence ratio of a component having a molecular weight Log M of 2.15 to 2.20 of the polyphenol derivative is preferably 0.5% by mass or less, and more preferably 0.25% by mass or less, and the existence ratio is preferably as small as possible.

The polyphenol derivative of the present invention, for example, preferably has a softening point of 140° C. or more and 210° C. or less in the case where the weight average molecular weight thereof is 3,000 or more and 4,000 or less, preferably has a softening point of 120° C. or more and 190° C. or less in the case where the weight average molecular weight thereof is 2,000 or more and less than 3,000, preferably has a softening point of 100° C. or more and 170° C. or less in the case where the weight average molecular weight thereof is 1,000 or more and less than 2,000, and preferably has a softening point of 90° C. or more and 170° C. or less in the case where the weight average molecular weight thereof is 600 or more and less than 1,000.

These polyphenol derivatives may be selected depending on the properties of the existing plastic material to be reacted therewith, and it is expected that the reactivity of the polyphenol derivative can be enhanced through the improvement of the mixing capability, so as to provide a molded article having enhanced properties, such as an enhanced flexural strength.

The weight average molecular weight may be measured by the method described in the examples shown later.

By the method for producing a polyphenol derivative of the present invention, in the content of lignin contained in the second generation ethanol fermentation residue and the second generation ethanol saccharification residue, 50% by mass or more thereof is preferably extracted as the polyphenol derivative, 60% by mass or more thereof is more preferably extracted as the polyphenol derivative, 70% by mass or more thereof is further preferably extracted as the polyphenol derivative, 80% by mass or more thereof is still further preferably extracted as the polyphenol derivative, and 90% by mass or more thereof is still more further preferably extracted as the polyphenol derivative.

The calculation method of the polyphenol content in the second generation ethanol fermentation residue and the second generation ethanol saccharification residue will be described specifically in the examples shown later.

[Polyphenol Derivative-Containing Resin Composition Material and Molded Article]

The present invention also provides a polyphenol derivative-containing material, particularly a polyphenol derivative-containing resin composition material, containing one or more polyphenol derivative of a polyphenol derivative produced by the aforementioned method for producing a polyphenol derivative and the aforementioned polyphenol derivative, and a molded article using the same. The polyphenol derivative-containing resin composition material may further contain one or more kind of a resin component, such as a thermosetting resin and a thermoplastic resin, an aldehyde compound, and the like, in addition to the polyphenol derivative obtained by the production method. The components other than the polyphenol derivative will be described below.

(Thermosetting Resin)

The polyphenol derivative-containing resin composition material may further contain a thermosetting resin.

Examples of the thermosetting resin include general thermosetting resins, such as a phenol resin, an epoxy resin, a polyurethane resin, a melamine resin, a urea resin, an unsaturated polyester resin, a silicone resin, and an alkyd resin. Among these, a phenol resin is preferred since a phenol resin has a phenolic hydroxy group as similar to the polyphenol derivative, can be reacted with the polyphenol derivative, and can be used as a diluent for the polyphenol derivative. In the phenol resin, a novolac phenol resin and a resol phenol resin are preferred. The thermoplastic resin may be used alone or as a combination of two or more kinds thereof.

The content of the thermosetting resin in the polyphenol derivative-containing plastic material may be determined depending on purposes, and is preferably 100 to 300 parts by mass, and more preferably 150 to 250 parts by mass, per 100 parts by mass of the polyphenol derivative, from the standpoint of the achievement of the good properties and the good moldability.

(Aldehyde Compound)

The polyphenol derivative-containing resin composition material may further contain an aldehyde compound.

The polyphenol derivative-containing resin composition material that contains the polyphenol derivative and an aldehyde compound can be a self-curing molding material.

Examples of the aldehyde compound include formaldehyde, paraformaldehyde, acetaldehyde, propionaldehyde, furfural, benzaldehyde, phenylacetaldehyde, and salicylaldehyde, and among these, formaldehyde is preferred.

The molar ratio of the phenol group and formaldehyde (formaldehyde/phenol group) contained in the polyphenol derivative is preferably 1.0 to 2.5, and more preferably 1.2 to 2.0. In the case where the molar ratio is in the range, the curing rate in reaction can be prevented from being lowered.

An alkali is preferably used from the standpoint of the acceleration of the curing reaction of the polyphenol derivative and the aldehyde compound. Examples of the alkali used include sodium hydroxide, potassium hydroxide, sodium carbonate, potassium carbonate, ammonia, tetramethylammonium hydroxide, and an alkylamine.

The temperature in the curing reaction of the polyphenol derivative and the aldehyde compound and the reaction time therefor are not particularly limited, and are generally approximately 60 to 130° C. and generally approximately 0.5 hour to 5 hours for the reaction time.

The polyphenol derivative-containing resin composition material may further contain one kind or two or more kinds selected from the thermosetting resin and the aldehyde compound in combination.

(Filler)

The polyphenol derivative-containing resin composition material may further contain a filler. The filler may be either an inorganic filler or an organic filler.

Examples of the inorganic filler include silica powder, such as spherical or crushed molten silica and crystalline silica, alumina powder, glass powder, glass fibers, glass flakes, mica, talc, calcium carbonate, alumina, hydrated alumina, boron nitride, aluminum nitride, silicon nitride, silicon carbide, titanium nitride, zinc oxide, tungsten carbide, and magnesium oxide.

Examples of the organic filler include carbon fibers, aramid fibers, paper powder, wood powder, cellulose fibers, cellulose powder, rice hull powder, fruit hulls and nut powder, chitin powder, and starch.

The inorganic filler and the organic filler may be used alone or as a combination of two or more kinds thereof, and the content thereof may be determined depending on purposes. In the case where the inorganic filler and/or the organic filler is contained, the content of the inorganic filler and/or the organic filler is preferably an appropriate amount for providing good properties and good moldability. From this standpoint, the content of the inorganic filler and/or the organic filler is preferably 50 to 200 parts by mass, and more preferably 80 to 150 parts by mass, per 100 parts by mass of the polyphenol derivative.

(Curing Agent)

The polyphenol derivative-containing resin composition material may further contain a curing agent.

Examples of the curing agent include hexamethylenetetramine, hexaformaldehyde, and paraformaldehyde. These compounds may be used alone or as a combination of two or more kinds thereof.

In addition to the curing agent, a catalyst, for example, an inorganic base, such as calcium hydroxide, sodium hydroxide, potassium hydroxide, calcium oxide, and magnesium oxide, a Lewis acid, such as zinc chloride and zinc acetate, and triethylamine, may be used for enhancing the curing rate and the curing degree. These compounds may be used alone or as a combination of two or more kinds thereof.

(Other Additives)

The polyphenol derivative-containing resin composition material according to the present embodiment may further contain various additives added thereto in such a range that does not impair the characteristics of the molded article obtained from the resin composition material. A compatibilizer, a surfactant, and the like may also be added depending on purposes.

Examples of the compatibilizer include a resin obtained by introducing a polar group by adding maleic anhydride, epoxy, or the like to a thermoplastic resin, such as a maleic anhydride-modified polyethylene resin, a maleic anhydride-modified polypropylene resin, and a commercially available compatibilizer, which may be used in combination.

Examples of the surfactant include a linear fatty acid, such as stearic acid, palmitic acid, and oleic acid, and a branched or cyclic fatty acid reacted with a rosin compound, but are not limited thereto.

Examples of the additives that can be mixed in addition to the above include a flexibilizer, a thermal stabilizer, an ultraviolet ray absorbent, a flame retarder, an antistatic agent, an anti-foaming agent, a thixotropy imparting agent, a release agent, an antioxidant, a plasticizer, a stress reducing agent, a coupling agent, a dye, a light scattering agent, and a small amount of a thermoplastic resin. These compounds may be used alone or as a combination of two or more kinds thereof.

(Thermoplastic Resin)

The thermoplastic resin that can be mixed in the polyphenol derivative-containing resin composition material is preferably an amorphous thermoplastic resin having a glass transition temperature of 200° C. or less or a crystalline thermoplastic resin having a melting point of 200° C. or less. Examples of the thermoplastic resin include a polycarbonate resin, a styrene resin, a polystyrene elastomer, a polyethylene resin, a polypropylene resin, a polyacrylic resin (such as a polymethyl methacrylate resin), a polyvinyl chloride resin, a cellulose acetate resin, a polyamide resin, a low melting point polyester resin, represented by a polyester having a combination of terephthalic acid and ethylene glycol, or terephthalic acid and 1,4-butanediol (such as PET and PBT), a polylactic acid and/or a copolymer containing a polylactic acid, an acrylonitrile-butadiene-styrene resin (ABS resin), a polyphenylene oxide resin (PPO), a polyketone resin, a polysulfone resin, a polyphenylene sulfide resin (PPS), a fluorine resin, a silicone resin, a polyimide resin, a polybenzimidazole resin, a polyamide elastomer, and copolymers of these resins and another monomer.

In the case where the polyphenol derivative is used as an additive for a thermoplastic resin, the known methods described, for example, in JP 2014-15579 A and WO 2016/104634 may be used. The content of the thermoplastic resin in the polyphenol derivative resin composition material is preferably 30% by mass or more and 99.9% by mass or less, more preferably 40% by mass or more and 99.9% by mass or less, further preferably 45% by mass or more and 99.9% by mass or less, and particularly preferably 50% by mass or more and 99.9% by mass or less, based on the total amount of the resin composition material, from the standpoint of the achievement of the significant flowability and strength.

The polyphenol derivative-containing resin composition material may contain a resin that is compatible with the thermoplastic resin composition material, an additive, and a filler, in addition to the thermoplastic resin described above.

(Kneading and Molding)

The components used in the polyphenol derivative-containing resin composition material may be mixed and kneaded, for example, by a method using an equipment having been ordinarily used, for example, by preliminarily mixing with a ribbon blender, a drum tumbler, or the like, and then mixing and kneading with a Henschel mixer, a Banbury mixer, a single screw extruder, a twin screw extruder, a multiple screw extruder, a roll kneader, a co-kneader, or the like. The heating temperature in kneading is generally appropriately selected in a range of 100 to 300° C.

The method of molding the polyphenol derivative-containing resin composition material is not particularly limited. Examples thereof include a press molding method, an injection molding method, a transfer molding method, a hollow molding method, and an FRP molding method. In the case where the resin composition material is a thermoplastic resin composition material, examples of the method of molding into a prescribed shape include an extrusion molding method and an injection molding method.

Examples of the molded article using the polyphenol derivative-containing resin composition material include an article obtained by curing a resin composition material containing the polyphenol derivative and a curing agent mixed therein, an article obtained by further mixing various fillers and an industrially produced ordinary phenol resin depending on necessity, molding into a prescribed shape, and then curing, or molding after curing, and an article obtained by molding a resin composition material containing the polyphenol derivative and a thermoplastic resin mixed with each other. Examples of the molded article using the polyphenol derivative-containing resin composition material include a heat insulating material for housing, an electronic component, a resin for frac sand, a resin for coated sand, a resin for impregnation, a resin for lamination, a resin for FRP molding, an automobile component, a reinforcing material for an automobile tire, an OA equipment, a machine, an information and communication equipment, and an industrial material.

The polyphenol derivative has a potential applicability to polyphenol derivative-containing materials, in addition to the resin composition material. Examples of the polyphenol derivative-containing material other than the polyphenol derivative-containing resin composition material include a carbon material, such as carbon black and carbon fibers, a lubricant, such as a grease base, antioxidative or antibacterial foods or cosmetics, a cement additive, an concrete additive, a binder, a rubber composition, a packaging material, such as a gas-barrier film, an agricultural material, such as a plant activator and a soil improver, an ink, a toner, an adhesive, a surfactant, an ultraviolet ray absorbent, an electrode material for a storage battery, a growth promoter for an aquatic life and the like, and a discoloration inhibitor for foods.

EXAMPLES

The present invention will be described more specifically with reference to examples and comparative examples, but the present invention is not limited thereto.
<Calculation of Lignin Content in Second Generation Ethanol Saccharification Residue (Raw Material)>
The content of lignin contained in the biomass residue used in the examples was calculated by the constituent sugar analysis after subjecting to a pretreatment in the following manner.
[Pretreatment]
As the pretreatment, the raw material was crushed with a Wiley mill and dried at 105° C. to form a specimen.
[Constituent Sugar Analysis]
A suitable amount of the specimen was weighed, to which 72% by mass sulfuric acid was added, and allowed to stand at 30° C. for 1 hour under agitation as needed. The reaction liquid was completely transferred to a pressure tight bottle while diluting with pure water, which was treated in an autoclave at 120° C. for 1 hour, and then the filtrate and the residue were separated by filtration. The monosaccharides in the filtrate were quantitatively determined by the high-performance liquid chromatography method. The C6 polysaccharides (mainly containing glucan) were designated as cellulose, and the C5 polysaccharides (mainly containing xylan) were designated as hemicellulose.
[Lignin]
The residue obtained through filtration in the process of the constituent sugar analysis was dried at 105° C., and measured for the weight thereof, and the cracked residue ratio was calculated. The content of lignin was calculated by compensating for the ash content.

<Properties of Lignin Derivative and Lignin in Raw Material>
The lignin derivative obtained in the examples and lignin in the raw material were subjected to various measurements in the following manner.
[Measurement of Molecular Weight]
The lignin derivative obtained in the examples or lignin in the raw material was measured for the weight average molecular weight (Mw) in terms of standard polystyrene conversion molecular weight with GPC (gel permeation chromatography). The measurement device and conditions were as follows.
  Separation column: "TSKgel SuperMultipore HZ-M×2, produced by Tosoh Corporation
  Eluent: tetrahydrofuran
  Flow amount of eluent: 1.0 mL/min
  Detector: differential refractive index (RI)
  Measurement temperature: 40° C.
[Existence Ratio of Component having Molecular Weight Log M of 2.15 to 2.20]
In a molecular weight chart of lignin obtained by GPC (gel permeation chromatography) (with dw/d Log M plotted on y-axis and Log M plotted on x-axis), the positions (Log M) expected to assign the existence of peaks, such as a peak top and a shoulder peak, were found, and each were designated as an average (A) of the gaussian function. In addition, the value of the dispersion (5) and an arbitrary number (X) for each of the gaussian functions were set. The gaussian functions were set for the number (N) of the expected peaks or shoulders, and three variables A, S, and X were set to each of them. The correlation coefficient $R^2$ was calculated from the composite function (linear sum) of the N gaussian functions and the y-axis of the GPC chart, i.e., dw/d Log M, and the variables A, S, and X of each of the gaussian functions set to maximize $R^2$ were manipulated. Specifically, the manipulation was performed with a solver of a spreadsheet software, such as Excel. Herein, it is necessary to manipulate A, S, and X of the functions appropriately to provide at least $R^2$ of 0.9999 or more. After the manipulation, the proportion of the composite function of the plural gaussian functions existing in a molecular weight Log M of 2.15 to 2.20 with respect to the composite function of all the gaussian functions was designated as the existence ratio of the component having a molecular weight Log M of 2.15 to 2.20.
[Softening Point (° C.)]
The lignin derivative obtained in the examples or the raw material (solid specimen) was crushed with a mortar, from which large particles were removed with a sieve (40 mesh), and 10 to 20 mg of the crushed specimen was placed in an aluminum cup (diameter of circular upper part: 60 mm, diameter of lower part: 53 mm, depth: 15 mm). The aluminum cup having the specimen placed therein was placed on a hot plate (Asone ND-2A), and closed with a glass plate (thickness: 0.5 mm). After heating to 80° C., the temperature was increased by 10° C., and the temperature at which the specimen was melted was confirmed by visual observation through the glass plate and designated as the softening point.
[Relative Existence Ratio of Basic Skeleton (%) and Hydroxy Group Ratio (%)]
(1) A solvent obtained by mixing deuterated chloroform, pyridine, and cyclohexanol (internal standard) was added to the lignin derivative obtained in the example or the raw material (solid specimen), to which 2-chloro-4,4,5,5-tetramethyl-1,3,2-dioxaphospholane was added as a derivatization reagent, and heated to 50° C. for 1 hour. Thereafter, the $^{31}$P-NMR measurement was performed under the following measurement condition.

The comparative raw material lignin 2 was not completely dissolved in the solvent, and only the soluble portion was measured. The measurement device and the condition were as follows.

Pulse width: 30°
Repetition time: 2 seconds
Measurement range: −60 to 200 ppm
Cumulative number: 200

Assuming that the signal derived from cyclohexanol as the internal standard was 145.2 ppm, a range of 144.0 to 142.0 ppm was identified as the S-type skeleton, a range of 141.0 to 136.6 ppm was identified as the G-type skeleton, and the relative existence ratios (%) of such of basic skeletons were calculated from the integrated values. The relative existence ratio of the H-type skeleton was calculated by subtracting the relative existence ratios of the S-type skeleton and the G-type skeleton from the total aromatic hydroxy group amount.

Furthermore, a range of 150.0 to 145.5 ppm was identified as the aliphatic hydroxy group, a range of 144.7 to 136.6 ppm was identified as the aromatic hydroxy group, and the aliphatic hydroxy group amount (mol/g) and the aromatic hydroxy group amount (mol/g) were calculated from the integral curve, from which the hydroxy group ratios (%) thereof were obtained.

(2) Ratio of Existence Ratios and Reactive Site

The followings were calculated based on the relative existence ratios (%) of the basic skeletons.

Ratio ((2H+G)/S) of the total of twice of the relative existence ratio H (%) of the H-type skeleton and the relative existence ratio G (%) of the G-type skeleton with respect to the relative existence ratio S (%) of the S-type skeleton Total of reactive sites (2H+G) based on the relative existence ratio H (%) of the H-type skeleton and the relative existence ratio G (%) of the G-type skeleton

[Lignin Derivative]

Example 1

(1) Reaction Step 100.1 parts by mass of a second generation ethanol saccharification residue (lignin content: 55% by mass) (100.1 g, 55.0 g of lignin), 20 parts by mass of phenol, and 200 parts by mass of ethanol were placed in a 1.0 L pressure tight vessel capable of performing agitation, and heated and agitated at 2.6 MPa and 200° C. for 4 hours.

(2) Purification Step (2-1) Filtration

A pressure filtration device having No. 2 filter paper installed was fabricated, to which the reaction liquid obtained in the reaction step is put and filtered by pressurizing to 0.1 to 0.4 MPa with compressed air or nitrogen.

(2-2) Distillation

The filtrate obtained through the filtration above was distilled by heating (40 to 60° C.) under reduced pressure (5 to 10 kPa) by using an evaporator, so as to remove ethanol and phenol.

(2-3) Drying Under Reduced Pressure

For removing phenol remaining in the distillation above, vacuum drying was performed by heating (120 to 150° C.) under reduced pressure (1.0 to 5.0 kPa) for removing phenol, so as to provide a lignin derivative 1 (52.9 g).

The calculated amount of the lignin derivative (30.0 g) with respect to the amount of the charged lignin (calculated value: 55.0 g) was calculated as the yield according to the following expression, and was 54%.

Yield (%)=((amount of lignin derivative)/(amount of charged lignin))×100

Example 2

The same procedures as in Example 1 were performed except that 37 parts by mass of phenol and 183 parts by mass of ethanol were used, so as to provide a lignin derivative 2 (amount of lignin derivative: 52.9 g, yield: 96%).

Example 3

The same procedures as in Example 1 were performed except that 10 parts by mass of phenol and 210 parts by mass of ethanol were used, so as to provide a lignin derivative 3 (amount of lignin derivative: 26.4 g, yield: 48%).

Example 4

The same procedures as in Example 1 were performed except that 51 parts by mass of phenol and 169 parts by mass of ethanol were used, so as to provide a lignin derivative 4 (amount of lignin derivative: 52.1 g, yield: 95%).

Example 5

The same procedures as in Example 1 were performed except that 20 parts by mass of phenol, 100 parts by mass of ethanol, and 100 parts by mass of water were used, so as to provide a lignin derivative 5 (amount of lignin derivative: 47.6 g, yield: 86%).

Example 6

The same procedures as in Example 3 were performed except that 180 parts by mass of ethanol and 20 parts by mass of water were used, so as to provide a lignin derivative 6 (amount of lignin derivative: 37.3 g, yield: 68%).

Example 7

The same procedures as in Example 3 were performed except that 160 parts by mass of ethanol and 40 parts by mass of water were used, so as to provide a lignin derivative 7 (amount of lignin derivative: 39.8 g, yield: 72%).

Example 8

The same procedures as in Example 1 were performed except that 0.2 part by mass of sulfuric acid was added, and the reaction time was 2 hours, so as to provide a lignin derivative 8 (amount of lignin derivative: 37.8 g, yield: 69%).

Example 9

The same procedures as in Example 1 were performed except that 44 parts by mass of phenol, 154 parts by mass of ethanol, and 22 parts by mass of water were used, the reaction temperature was 220° C., and the reaction time was 2 hours, so as to provide a lignin derivative 9 (amount of lignin derivative: 42.4 g, yield: 77%).

Example 10

The same procedures as in Example 9 were performed except that the reaction temperature was 200° C., and the reaction time was 4 hours, so as to provide a lignin derivative 10 (amount of lignin derivative: 37.8 g, yield: 69%).

Example 11

The same procedures as in Example 10 were performed except that 0.2 part by mass of sulfuric acid was added, so as to provide a lignin derivative 11 (amount of lignin derivative: 43.6 g, yield: 79%).

Example 12

The same procedures as in Example 10 were performed except that anisole was used instead of phenol, so as to provide a lignin derivative 12 (amount of lignin derivative: 36.8 g, yield: 67%).

Example 13

The same procedures as in Example 11 were performed except that anisole was used instead of phenol, so as to provide a lignin derivative 13 (amount of lignin derivative: 39.7 g, yield: 72%).

Example 14

The same procedures as in Example 11 were performed except that toluene was used instead of phenol, so as to provide a lignin derivative 14 (amount of lignin derivative: 35.1 g, yield: 64%).

Example 15

The same procedures as in Example 10 were performed except that 66 parts by mass of phenol and 132 parts by mass of ethanol were used, so as to provide a lignin derivative 14 (amount of lignin derivative: 46.3 g, yield: 84%).

The results of the measurement in the aforementioned methods for the properties of the lignin derivatives 1 to 15 obtained in Examples 1 to 15 are shown in Tables 1 and 2.

In the measurement of the molecular weight, a part of the lignin derivative 5 was insoluble in the eluent, and thus the measurement of the molecular weight (Mw) of Example 5 was designated as unable to analyze.

Comparative Example 1

As Comparative Example 1, the properties of lignin in the second generation ethanol saccharification residue as the raw material were analyzed, but the lignin in the second generation ethanol saccharification residue was dissolved only slightly in various organic solvents, and thus was unable to analyze by the methods described above.

Comparative Example 2

As Comparative Example 2, kraft lignin (Lignin, alkali (product No. 370959), produced by Sigma-Aldrich Corporation) was used. The properties of the kraft lignin were analyzed, but the kraft lignin contained a large amount of components that were insoluble in various organic solvents, and thus the analysis by the aforementioned method was able to perform for only a part thereof.

Comparative Example 3

The same procedures as in Example 8 were performed except that phenol was not added, and 220 parts by mass of ethanol was used, so as to provide comparative lignin 1 (amount of lignin derivative: 25.9 g, yield: 47%).

Comparative Example 4

The same procedures as in Example 1 were performed except that phenol was not added, and 110 parts by mass of ethanol and 110 parts by mass of water were used, so as to provide comparative lignin 2 (amount of lignin derivative: 43.3 g, yield: 79%).

TABLE 1

|  |  | Aromatic compound/ lignin (mass ratio) | Aromatic compound (part by mass) | Solvent (part by mass) |
| --- | --- | --- | --- | --- |
| Example 1 | Lignin derivative 1 | 0.36 | phenol (20 parts) | EtOH (200 parts) |
| Example 2 | Lignin derivative 2 | 0.67 | phenol (37 parts) | EtOH (183 parts) |
| Example 3 | Lignin derivative 3 | 0.18 | phenol (10 parts) | EtOH (210 parts) |
| Example 4 | Lignin derivative 4 | 0.93 | phenol (51 parts) | EtOH (169 parts) |
| Example 5 | Lignin derivative 5 | 0.36 | phenol (20 parts) | EtOH/water (100 parts/100 parts) |
| Example 6 | Lignin derivative 6 | 0.18 | phenol (10 parts) | EtOH/water (180 parts/20 parts) |
| Example 7 | Lignin derivative 7 | 0.18 | phenol (10 parts) | EtOH/water (160 parts/40 parts) |
| Example 8 | Lignin derivative 8 | 0.36 | phenol (20 parts) | EtOH (200 parts) |
| Example 9 | Lignin derivative 9 | 0.80 | phenol (44 parts) | EtOH/water (154 parts/22 parts) |
| Example 10 | Lignin derivative 10 | 0.80 | phenol (44 parts) | EtOH/water (154 parts/22 parts) |
| Example 11 | Lignin derivative 11 | 0.80 | phenol (44 parts) | EtOH/water (154 parts/22 parts) |
| Example 12 | Lignin derivative 12 | 0.80 | anisole (44 parts) | EtOH/water (154 parts/22 parts) |
| Example 13 | Lignin derivative 13 | 0.80 | anisole (44 parts) | EtOH/water (154 parts/22 parts) |

TABLE 1-continued

| | | | | |
|---|---|---|---|---|
| Example 14 | Lignin derivative 14 | 0.80 | toluene (44 parts) | EtOH/water (154 parts/22 parts) |
| Example 15 | Lignin derivative 15 | 1.20 | phenol (66 parts) | EtOH/water (132 parts/22 parts) |
| Comparative Example 1 | Comparative raw material lignin 1 | — | — | — |
| Comparative Example 2 | Comparative raw material lignin 2 | — | — | — |
| Comparative Example 3 | Comparative lignin 1 | — | — | EtOH (220 parts) |
| Comparative Example 4 | Comparative lignin 2 | — | — | EtOH/water (110 parts/110 parts) |

| | Ratio of aromatic compound (% by mass)* | Yield | Mw | Existence ratio of Log M 2.15 to 2.20 component (% by mass) | Softening point (° C.) |
|---|---|---|---|---|---|
| Example 1 | 9.1% | 54% | 3164 | 0.01 | 150 |
| Example 2 | 16.8% | 96% | 3590 | 0.02 | 180 |
| Example 3 | 4.5% | 48% | 3162 | 0.02 | 160 |
| Example 4 | 23.2% | 95% | 3555 | 0.02 | 180 |
| Example 5 | 9.1% | 86% | Nnable to analyze | 0.06 | 205 |
| Example 6 | 4.8% | 68% | 3653 | 0.03 | 190 |
| Example 7 | 4.8% | 72% | 3285 | 0.11 | 200 |
| Example 8 | 9.1% | 69% | 3105 | 0.01 | 190 |
| Example 9 | 20.0% | 77% | 2668 | 0.12 | 175 |
| Example 10 | 20.0% | 69% | 3277 | 0.15 | 190 |
| Example 11 | 20.0% | 79% | 3748 | 0.11 | 200 |
| Example 12 | 20.0% | 67% | 3198 | 0.34 | 200 |
| Example 13 | 20.0% | 72% | 3852 | 0.67 | 200 |
| Example 14 | 20.0% | 64% | 3772 | 0.47 | 190 |
| Example 15 | 30.0% | 84% | 3017 | 0.04 | 200 |
| Comparative Example 1 | — | — | Nnable to analyze | Nnable to analyze | Not melted |
| Comparative Example 2 | — | — | Nnable to analyze | Nnable to analyze | Not melted |
| Comparative Example 3 | — | 47% | 2756 | 0.70 | 135 |
| Comparative Example 4 | — | 79% | Nnable to analyze | 0.26 | 215 |

Ratio of aromatic compound (% by mass)*: ((amount of aromatic compound)/(total amount of aromatic compound and solvent)) × 100

TABLE 2

| | | Ratio of aliphatic hydroxy group (%) | Ratio of aromatic hydroxy group (%) | H nucleus | G nucleus | S nucleus | ((2H + G)/S) | (2H + G) |
|---|---|---|---|---|---|---|---|---|
| Example 1 | Lignin derivative 1 | 25 | 75 | 5 | 64 | 31 | 2.4 | 74.3 |
| Example 2 | Lignin derivative 2 | 23 | 77 | 6 | 64 | 30 | 2.5 | 75.2 |
| Example 3 | Lignin derivative 3 | 24 | 76 | 5 | 64 | 32 | 2.3 | 73.4 |
| Example 4 | Lignin derivative 4 | 22 | 78 | 6 | 65 | 30 | 2.6 | 75.8 |
| Example 5 | Lignin derivative 5 | 19 | 81 | 6 | 64 | 31 | 2.5 | 75.2 |
| Example 6 | Lignin derivative 6 | 21 | 79 | 5 | 65 | 30 | 2.5 | 74.7 |
| Example 7 | Lignin derivative 7 | 21 | 79 | 6 | 63 | 31 | 2.4 | 74.4 |
| Example 8 | Lignin derivative 8 | 23 | 77 | 5 | 66 | 30 | 2.6 | 75.4 |
| Example 9 | Lignin derivative 9 | 21 | 79 | 6 | 64 | 30 | 2.5 | 75.5 |
| Example 10 | Lignin derivative 10 | 22 | 78 | 6 | 64 | 30 | 2.5 | 75.6 |
| Example 11 | Lignin derivative 11 | 21 | 79 | 6 | 65 | 30 | 2.6 | 76.0 |
| Example 12 | Lignin derivative 12 | 20 | 80 | 6 | 62 | 32 | 2.3 | 74.4 |
| Example 13 | Lignin derivative 13 | 21 | 79 | 6 | 63 | 31 | 2.4 | 74.9 |
| Example 14 | Lignin derivative 14 | 23 | 77 | 6 | 62 | 32 | 2.3 | 74.1 |
| Example 15 | Lignin derivative 15 | 19 | 81 | 5 | 66 | 28 | 2.7 | 77.2 |
| Comparative Example 1 | Comparative raw material lignin 1 | Nnable to analyze | Nnable to analyze | Nnable to analyze | Nnable to analyze | Nnable to analyze | Nnable to analyze | Nnable to analyze |
| Comparative Example 2 | Comparative raw material lignin 2 | 30 | 70 | 15 | 67 | 19 | 5.1 | 95.9 |
| Comparative Example 3 | Comparative lignin 1 | 27 | 73 | 5 | 65 | 30 | 2.5 | 75.0 |
| Comparative Example 4 | Comparative lignin 2 | 20 | 80 | 6 | 61 | 33 | 2.2 | 72.6 |

As described above, there is a tendency that with a lower softening point of the lignin derivative, the mixing thereof with a resin becomes easier. Furthermore, there is also a tendency that with a smaller aliphatic hydroxy group amount of the lignin derivative, and with a larger ratio ((2H+G)/S) as an index of reactivity, the reaction with a resin becomes easier. Moreover, there is a tendency that with a molecular weight of the lignin derivative that is large to certain extent without becoming excessively small, the properties, such as the flexural strength, of the molded article formed therewith are improved.

It is understood from the consideration of Tables 1 and 2 from this standpoint that the comparison between Examples 1 to 15 and Comparative Examples 3 and 4 shows that the production method of the present invention can provide a lignin derivative that shows good compatibility with a resin and good reactivity thereto due to the softening point thereof of 210° C. or less without excessive decrease of the molecular weight, in a certain yield. In particular, it is understood that the simultaneous achievement of excellent results, i.e., the low softening point and the high yield, is enabled by regulating the ratio of the aromatic compound used, and the selection and the ratio of the solvent used. Furthermore, it is understood that in Comparative Examples 3 and 4 using no aromatic compound, the existence ratios of the component having a molecular weight of 50 to 300 are 0.70% by mass and 0.26% by mass respectively, which lead a concern of occurrence of problems, such as blister, in the use as a resin composition material.

Accordingly, Tables 1 and 2 show that the lignin derivatives of Examples have applicability to a lignin derivative-containing material, particularly a resin composition material, due to the improvement of the molecular weight and the composition.

The second generation ethanol saccharification residue as the raw material in Comparative Example 1 and the kraft lignin in Comparative Example 2 cannot be used directly as a resin composition material, whereas the production method of the present invention can provide a lignin derivative that can be actually used as a resin composition material.

[Cured Product]

In the following examples, resin composition materials and molded articles using the same were produced by using the lignin derivatives 2, 6, and 8 in Examples 2, 6, and 8, the second generation ethanol saccharification residue as the raw material in Comparative Example 1 (comparative raw material lignin 1), the kraft lignin in Comparative Example 2 (comparative raw material lignin 2), the comparative lignin 1 in Comparative Example 3, and the comparative lignin 2 in Comparative Example 4.

The resin composition materials and the molded articles were evaluated in the following manner.

(Easiness in Kneading)

In Examples 16 to 18 and Comparative Examples 5 to 8, the easiness in kneading was evaluated according to the following standard.
A: easy to knead
B: difficult but possible to knead
C: impossible to knead (Agitation Capability)

In Examples 19 to 21 and Comparative Examples 9 to 12, the easiness in agitation in reaction was evaluated according to the following standard.
A: easy to agitate
B: difficult but possible to agitate
C: impossible to agitate (Flexural Strength)

A specimen of 5 mm×50 mm×1 mm was cut out from each of the molded articles obtained in the examples, was measured for the flexural strength with Instron Model 5566, produced by Instron Japan Co., Ltd., under conditions of a three-point flexural mode, a span of 30 mm, and a speed of 2 mm/min, and evaluated by the standard.
A: specimen difficulty broken
B: specimen broken
C: specimen immediately broken
D: molding failure Examples 16 to 18

35 parts by mass of a novolac phenol resin (PR-53195, produced by Sumitomo Bakelite Co., Ltd.), 50 parts by mass of wood powder, 15 parts by mass of each of the lignin derivatives 2, 6, and 8 in Examples 2, 6, and 8, 7 parts by mass of hexamethylenetetramine as a curing agent, and 1 part of zinc stearate as an internal release agent were mixed and kneaded with a two-roll kneader at 110 to 120° C. for 3 minutes, so as to provide a lignin derivative-containing resin composition material.

The resulting lignin derivative-containing resin composition material was pressed into a cavity of a heated mold, and molded by a transfer molding method under molding conditions of 175° C. and 3 minutes, followed by curing in an oven at 180° C. for 8 hours, so as to provide a molded article.

The evaluation results of the resin composition materials and the molded articles are shown in Table 3.

Comparative Example 5

A resin composition material and a molded article were obtained by performing the same procedures as in Example 16 except that the second generation ethanol saccharification residue as the raw material (comparative raw material lignin 1) was used instead of the lignin derivative.

The evaluation results of the resin composition material and the molded article are shown in Table 3.

Comparative Example 6

A resin composition material and a molded article were obtained by performing the same procedures as in Example 16 except that the kraft lignin (comparative raw material lignin 2) was used instead of the lignin derivative.

The evaluation results of the resin composition material and the molded article are shown in Table 3.

Comparative Example 7

A resin composition material and a molded article were obtained by performing the same procedures as in Example 16 except that the comparative lignin 1 was used instead of the lignin derivative.

Comparative Example 8

A resin composition material and a molded article were obtained by performing the same procedures as in Example 16 except that the comparative lignin 2 was used instead of the lignin derivative.

The evaluation results of the resin composition materials and the molded articles are shown in Table 3.

TABLE 3

| | Example 16 | Example 17 | Example 18 | Comparative Example 5 | Comparative Example 6 | Comparative Example 7 | Comparative Example 8 |
|---|---|---|---|---|---|---|---|
| Lignin | Lignin derivative 2 | Lignin derivative 6 | Lignin derivative 8 | Comparative raw material lignin 1 | Comparative raw material lignin 2 | Comparative lignin 1 | Comparative lignin 2 |
| Easiness in kneading | A | A | A | C | B | A | B |
| Flexural strength | A | A | A | — | — | B | — |

Examples 19 to 21

In a 0.5 L separable flask equipped with a reflux condenser and agitation blades, 50 parts by mass (50.0 g) of each of the lignin derivatives 2, 6, and 8 in Examples 2, 6, and 8, and 30 parts by mass of a 40% by mass formaldehyde aqueous solution were added and agitated. The molar ratio of formaldehyde and phenol in the lignin derivative was 1.5. While 35 parts by mass of a 50% by mass sodium carbonate aqueous solution was gradually added dropwise thereto, the mixture was heated to 100° C. for 2 hours to provide a liquid composition.

54 parts by mass of wood powder was further added thereto, and the mixture was agitated until uniform, so as to provide a lignin derivative-containing resin composition material.

The resulting lignin derivative-containing resin composition material was depressurized to remove water, and press molded at a surface pressure of 0.2 MPa and 180° C. for 10 minutes, followed by curing in an oven at 200° C. for 4 hours, so as to provide a molded article.

The evaluation results of the resin composition materials and the molded articles are shown in Table 4.

Comparative Example 9

A resin composition material and a molded article were obtained by performing the same procedures as in Example 19 except that the second generation ethanol saccharification residue as the raw material (comparative raw material lignin 1) was used instead of the lignin derivative.

The evaluation results of the resin composition material and the molded article are shown in Table 4.

Comparative Example 10

A molded article was obtained by performing the same procedures as in Example 19 except that the kraft lignin (comparative raw material lignin 2) was used instead of the lignin derivative.

The evaluation results of the resin composition material and the molded article are shown in Table 4.

Comparative Example 11

A molded article was obtained by performing the same procedures as in Example 19 except that the comparative lignin 1 was used instead of the lignin derivative.

Comparative Example 12

A molded article was obtained by performing the same procedures as in Example 19 except that the comparative lignin 2 was used instead of the lignin derivative.

The evaluation results of the resin composition materials and the molded articles are shown in Table 4.

TABLE 4

| | Example 19 | Example 20 | Example 21 | Comparative Example 9 | Comparative Example 10 | Comparative Example 11 | Comparative Example 12 |
|---|---|---|---|---|---|---|---|
| Lignin | Lignin derivative 2 | Lignin derivative 6 | Lignin derivative 8 | Comparative raw material lignin 1 | Comparative raw material lignin 2 | Comparative lignin 1 | Comparative lignin 2 |
| Agitation capability | A | A | A | C | B | A | B |
| Flexural strength | A | A | A | — | B | B | B |

In Comparative Examples 7, 8, 11, and 12 using the comparative lignins 1 and 2 obtained without reaction with the aromatic compound, the results cannot be excellent in all the kneading capability, the agitation capability, and the strength. On the other hand, as shown in Tables 3 and 4, the lignin derivatives obtained in the present invention provide excellent kneading capability and excellent agitation capability in reaction, from which it is understood that the mixing capability is improved. It is also understood from the flexural properties of the molded articles obtained in Examples that molded articles having good properties can be obtained. It is understood from Comparative Examples 5, 6, 9, and 10 that the second generation ethanol saccharification residue as the raw material and the kraft lignin are difficult to use directly as a resin composition material.

Accordingly, it is understood from Tables 1 to 4 that the polyphenol derivative obtained by the production method of the present invention can be readily mixed with a resin due to the lowered softening point and the excellent kneading capability and agitation capability, can be readily reacted with a resin due to the reactive sites having high reactivity and the excellent flexural strength, and can simultaneously achieve the better decrease of the softening point, the high yield, and the good economic efficiency, by regulating the ratio of the aromatic compound used, and the selection and the ratio of the solvent used.

Accordingly, the polyphenol derivative obtained by the production method of the present invention is useful as a plastic material that satisfies the four requirements, i.e., (i) can be available at low cost, (ii) can be provided in a large quantity, (iii) can be readily mixed with a resin, and (iv) can be readily reacted with a resin.

INDUSTRIAL APPLICABILITY

The polyphenol derivative of the present invention has a decreased molecular weight to enhance the mixing capability with another plastic material, and has increased reactive sites. The enhancement of the properties of the molded article is expected due to the enhancement of the mixing capability and the increase of the reactive sites, and furthermore the easiness in mixing can omit the necessity of a costly extensive equipment in the production of a cured article. Moreover, lignin, most of which has been discarded, can be beneficially used, which is effective for the environmental preservation.

The invention claimed is:

1. A method for producing a polyphenol derivative, comprising reacting a polyphenol-containing composition and a phenol compound represented by the following formula (1) in a solvent, wherein a mass ratio of the phenol compound to lignin in the polyphenol-containing composition (phenol compound/lignin) is 0.1 to 2:

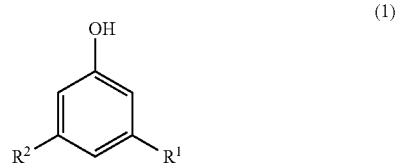

(1)

wherein, $R^1$ and $R^2$ each independently represent a hydrogen atom, a hydroxy group, or an alkyl group having 1 to 15 carbon atoms, in which $R^1$ and $R^2$ may be the same as or different from each other, wherein the reacting is performed without a catalyst.

2. The method for producing a polyphenol derivative according to claim 1, wherein the polyphenol-containing composition is one or more kind of a biomass and a biomass residue.

3. The method for producing a polyphenol derivative according to claim 1, wherein the polyphenol-containing composition is one or more kind of a second generation ethanol saccharification residue and a second generation ethanol fermentation residue.

4. The method for producing a polyphenol derivative according to claim 1, wherein at least one of $R^1$ and $R^2$ is a hydrogen atom.

5. The method for producing a polyphenol derivative according to claim 1, wherein the solvent contains a polar solvent.

6. The method for producing a polyphenol derivative according to claim 1, wherein the solvent contains one or more kind of an alcohol compound, a ketone compound, an ether compound, an aromatic compound, and water.

7. The method for producing a polyphenol derivative according to claim 1, wherein the phenol compound is used in an amount of 10 to 50% by mass based on the total amount of the phenol compound and the solvent.

8. The method for producing a polyphenol derivative according to claim 1, wherein the reaction is performed at a reaction temperature of more than 140° C. and 350° C. or less.

9. The method for producing a polyphenol derivative according to claim 1, wherein the reaction is performed at a reaction temperature of more than 140° C. and 250° C. or less.

10. The method for producing a polyphenol derivative according to claim 1, wherein the reaction is performed for a reaction time of 1 hour or more and 8 hours or less.

11. The method for producing a polyphenol derivative according to claim 1, wherein the method further comprising a solid-liquid separation step.

12. The method for producing a polyphenol derivative according to claim 1, wherein the reaction is performed at a reaction temperature of more than 180° C. and 230° C. or less.

13. The method for producing a polyphenol derivative according to claim 1, wherein the solvent contains an organic solvent and water, and wherein a mass ratio of the organic solvent and the water is 95/5 to 50/50.

* * * * *